(12) United States Patent
Lee

(10) Patent No.: US 9,140,371 B2
(45) Date of Patent: Sep. 22, 2015

(54) AIR VALVE

(75) Inventor: Sang Bok Lee, Chungcheongnam-do (KR)

(73) Assignee: HAN IL E HWA CO., LTD., Seoul (KR)

( * ) Notice: Subject to any disclaimer, the term of this patent is extended or adjusted under 35 U.S.C. 154(b) by 125 days.

(21) Appl. No.: 13/704,783

(22) PCT Filed: Jun. 20, 2011

(86) PCT No.: PCT/KR2011/004470
§ 371 (c)(1),
(2), (4) Date: Feb. 11, 2013

(87) PCT Pub. No.: WO2012/023698
PCT Pub. Date: Feb. 23, 2012

(65) Prior Publication Data
US 2013/0139904 A1      Jun. 6, 2013

(30) Foreign Application Priority Data

Aug. 17, 2010   (KR) .................. 10-2010-0079408

(51) Int. Cl.
*F16K 13/00*     (2006.01)
*B60N 2/52*      (2006.01)
*F16K 27/04*     (2006.01)

(52) U.S. Cl.
CPC ............. *F16K 13/00* (2013.01); *B60N 2/525* (2013.01); *F16K 27/041* (2013.01); *Y10T 137/598* (2015.04)

(58) Field of Classification Search
CPC ........ B60N 2/525; F16K 13/00; F16K 27/041
USPC ................. 137/315.11; 297/311, 344.16
See application file for complete search history.

(56) References Cited

U.S. PATENT DOCUMENTS

| | | | | |
|---|---|---|---|---|
| 2,614,794 | A * | 10/1952 | Imhoff | 251/286 |
| 4,687,466 | A * | 8/1987 | Larsson | 604/82 |
| 5,590,736 | A * | 1/1997 | Morris et al. | 180/282 |
| 5,975,108 | A * | 11/1999 | Cho | 137/205 |
| 5,975,116 | A * | 11/1999 | Rosas et al. | 137/315.11 |
| 6,439,259 | B1 * | 8/2002 | Beaver | 137/232 |
| 2008/0308519 | A1 * | 12/2008 | Farrar et al. | 215/329 |

FOREIGN PATENT DOCUMENTS

KR   10-2002-0029130     4/2002
KR   10-2008-0068349     7/2008

OTHER PUBLICATIONS

International Search Report for PCT/KR2011/004470 Dec. 15, 2012.

* cited by examiner

*Primary Examiner* — John K Fristoe, Jr.
*Assistant Examiner* — Kevin Barss
(74) *Attorney, Agent, or Firm* — Pearne & Gordon LLP

(57) ABSTRACT

An air valve includes: a valve body into which an air cut-off unit is inserted; and a valve cap preventing the air cut-off unit from being discharged outside of the valve body, wherein the valve body and the valve cap are coupled to each other by a snap-fit method.

13 Claims, 2 Drawing Sheets

AIR VALVE

BACKGROUND OF THE INVENTION

The present invention relates to an air valve used for controlling the height or balance of a vehicle seat.

In general, the height of a vehicle seat is controlled for passenger's convenience. Additionally, the balance of the vehicle seat is also controlled for passenger's convenience. Conventionally, the vehicle seat may include an air spring to control the height or balance of the seat.

The air spring is connected to a compressed air tank. The air spring receives air from the compressed air tank so as to control the height of the vehicle seat. Further, the air spring receives air from the compressed air tank so as to control the balance of the vehicle seat.

The air spring includes an air valve. The air valve is connected between the air spring and the compressed air tank. The air valve selectively cuts off air supplied to the air spring.

The air valve has an air inlet formed therein, through which the air is introduced. The air inlet is connected to the compressed air tank. Furthermore, the air valve has an air outlet formed therein, through which air is discharged. The air outlet is connected to the air spring. Therefore, the air of the compressed air tank is transferred to the air spring through the air valve.

The air valve includes an air cut-off unit. The air cut-off unit is inserted into the air valve. The air cut-off unit selectively blocks air supplied from the air inlet and the air outlet.

The air valve includes a valve cap to prevent the air cut-off unit from being discharged outside of the air valve. The valve cap is attached to one side of the air valve body. The valve cap is attached to the air valve body by way of an ultrasonic bonding method. The connection strength of the valve cap and the air valve body is increased due to the ultrasonic bonding method.

However, when the air valve requires checking, maintenance or repair, there are difficulties in separating the valve cap from the air valve body.

SUMMARY OF THE INVENTION

An embodiment of the present invention is directed to an air valve for easily coupling or separating a valve cap to or from a valve body by coupling the valve cap and the valve body according to a snap-fit method.

In accordance with an embodiment of the present invention, an air valve includes: a valve body into which an air cut-off unit is inserted; and a valve cap preventing the air cut-off unit from being discharged to the outside of the valve body, wherein the valve body and the valve cap are coupled to each other by a snap-fit method.

DESCRIPTION OF SPECIFIC EMBODIMENTS

Figure 1:
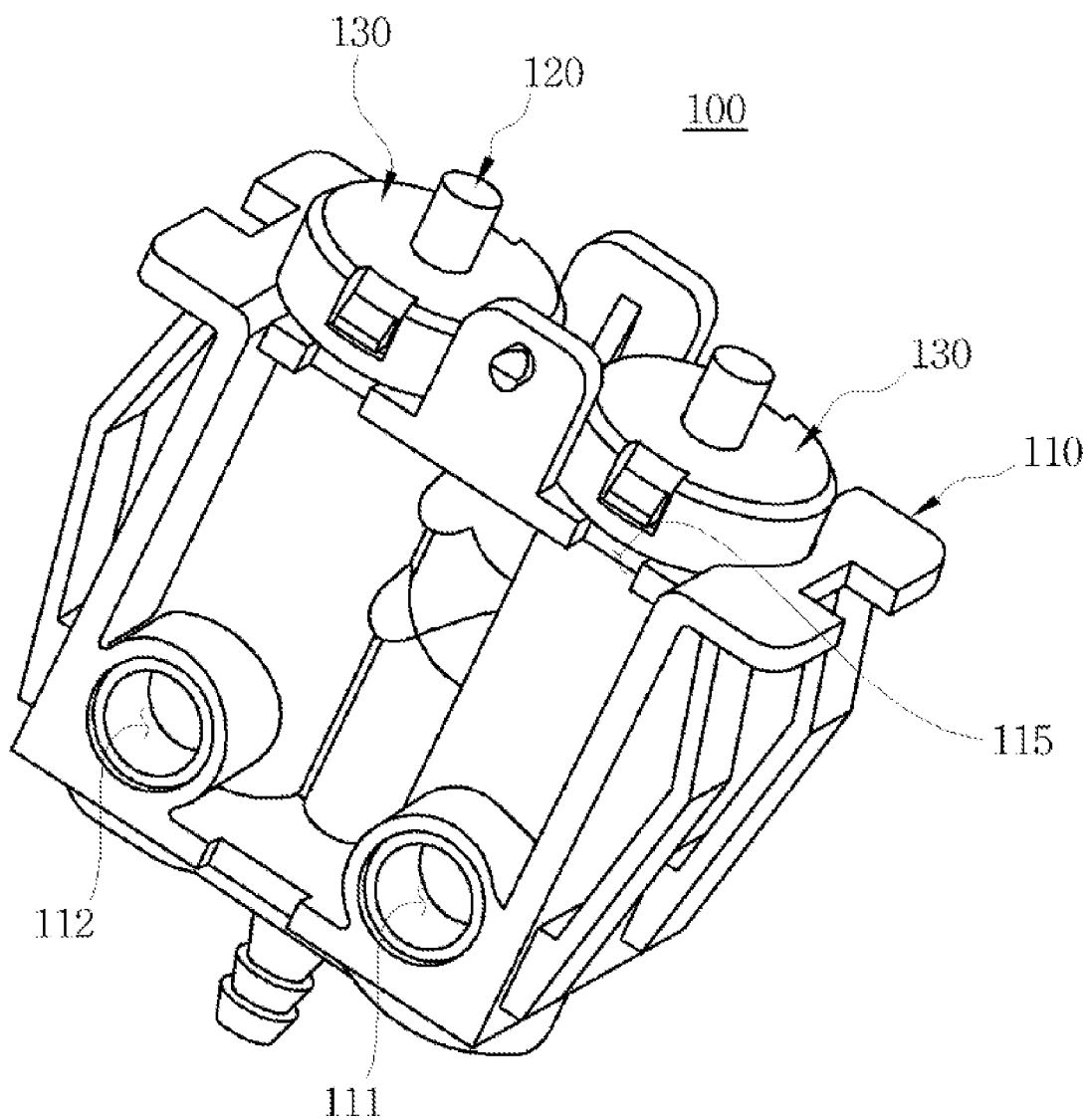
FIG. 1 is a perspective view of an air valve in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
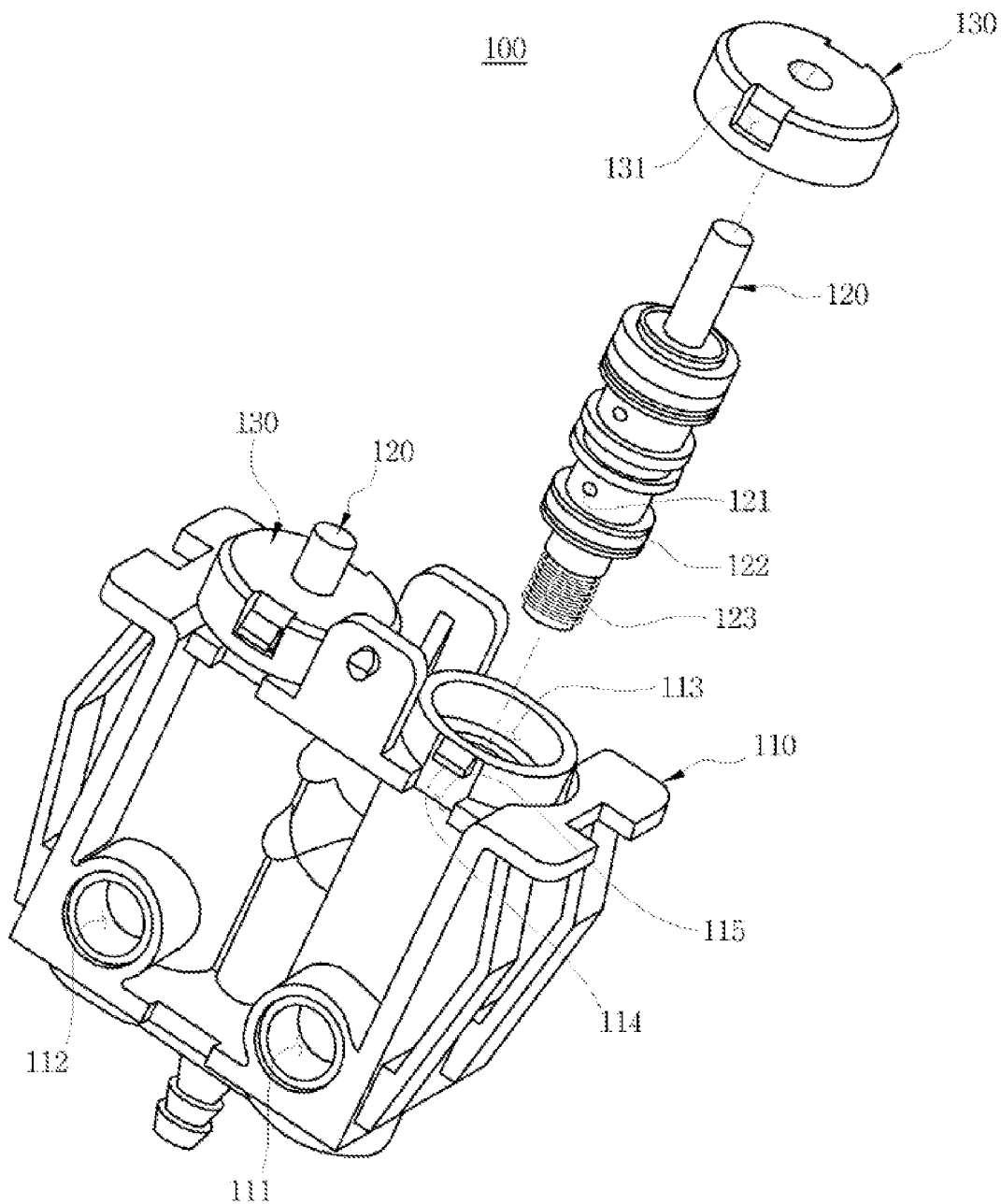
FIG. 2 is an expanded view of the air valve in accordance with an embodiment of the present invention.

FIG. 1 is a perspective view of an air valve 100 in accordance with an embodiment of the present invention. FIG. 2 is an expanded view of the air valve 100 in accordance with the embodiment of the present invention.

Referring to FIGS. 1 and 2, the air valve 100 includes a valve body 110. The valve body 110 may form a basic frame of the air valve 100. The valve body 110 may be coupled to one side of a vehicle seat (not illustrated).

At this time, the valve body 110 may further include a coupling unit (not illustrated). One side of the coupling unit may be integrated with the valve body 110. Alternatively, the one side of the coupling unit may be coupled to the valve body 110 by a separate coupling device. The other side of the coupling unit may be coupled to the vehicle seat. Therefore, the position of the air valve 100 may be fixed to the vehicle.

The valve body 110 may be formed of a high-strength material. Therefore, the valve body 110 may be prevented from being damaged or destroyed by an impact upon the vehicle.

For example, the vehicle may receive an impact from an external source while the vehicle is being driven. At this time, the impact force being transferred to the vehicle may in turn be transferred to the vehicle seat. The impact force transferred to the vehicle seat may be transferred to the air valve 100. Since the valve body 110 is formed of a high-strength material, the valve body may be prevented from being damaged or destroyed by the impact force transferred to the vehicle seat.

The valve body 110 includes an air inlet 111. The air inlet 111 may be formed through one side of the valve body 110. The air inlet 111 may be connected to a separate air storage device (not illustrated).

The valve body 110 includes an air outlet 112. The air outlet 112 may be formed through the one side of the valve body 110. The air outlet 112 may be connected to a separate air pump (not illustrated) or the like.

At this time, the air inlet 111 and the air outlet 112 may be connected to each other. Therefore, a user can transfer the air of the air storage device to the air pump through the air valve 100.

The valve body 110 includes an insertion groove 113 into which an air cut-off unit 120 is inserted. The insertion groove 113 may have an opening formed on one side thereof. The insertion groove 113 may be formed toward the inward direction of the valve body 110.

The user selectively cuts air supplied to the air pump using the air cut-off unit 120 inserted into the insertion groove 113.

For example, the air cut-off unit 120 may have an air duct 121 formed therein. The air duct 121 may correspond to the position of the air inlet 111 or the air outlet 112. Furthermore, the air cut-off unit 120 includes a blocking member 122. The blocking member 122 may selectively block the air inlet 111 or the air outlet 112.

Under default operation, the blocking member 122 blocks the air inlet 111 or the air outlet 112. The user presses the top or bottom of the air cut-off unit 120 so as to match the position of the air duct 121 with the position of the air inlet 111 or the air outlet 112.

At this time, the air cut-off unit 120 may be pressed by a lever (not illustrated) or the like. Furthermore, the air cut-off unit 120 may be manually pressed.

For convenience of description, the following descriptions will be focused on a case in which the air cut-off unit 120 is pressed by the lever mentioned above.

The air cut-off unit 120 may be pressed by the lever. The air cut-off unit 120 may be pressed to match the position of the air duct 121 with the position of the air inlet 111 or the air outlet 112. Therefore, the air of the air supply device may be transferred to the air pump.

The air cut-off unit 120 may include a spring 123. The spring 123 may be compressed while the air cut-off unit 120 is pressed. Therefore, the blocking member 122 may be positioned at the air inlet 111 or the air outlet 112 by the compensating force of the spring 123.

The air valve 100 includes a valve cap 130. The valve cap 130 may prevent the air cut-off unit 120 from being discharged to the outside of the valve body 110.

The valve cap 130 may be coupled to the top of the valve body 110. The valve cap 130 may be coupled to the opening of the insertion groove 113. At this time, the valve cap 130 and the valve body 110 may be coupled by a snap-fit method.

For example, the valve body 110 includes a locking bump 114. The locking bump 114 may be formed to protrude from one side of the valve body 110. Specifically, the locking bump 114 may be formed to protrude from a section corresponding to which the valve cap 130 is coupled.

The valve cap 130 includes a coupling hole 131. The coupling hole 131 may be formed through one side of the valve cap 130. The coupling hole 131 may be formed corresponding to the section with which the valve body 110 is coupled. The locking bump 114 may be inserted into the coupling hole 131.

At this time, the size of the coupling hole 131 may correspond to the size of the locking bump 114. The locking bump 114 may be completely inserted into the coupling hole 131. As the locking bump 114 is inserted into the coupling hole 131, the valve body 110 and the valve cap 130 may be coupled to each other by a snap-fit method. Therefore, the valve cap 130 may be fixed to the valve body 110.

At this time, the length of the locking bump 114 may be increased toward one side thereof. That is, the locking bump 114 may be manufactured in a triangle shape of which the length is increased toward one side. The valve cap 130 may be moved in the downward direction of the valve body 110 along an inclined surface of the locking bump 114.

Therefore, the user may easily couple the valve cap 130 to the valve body 110 through the inclined surface of the locking bump 114.

At this time, the valve cap 130 may be manufactured of a material having elastic force. As the valve cap 130 has elastic force, the user may easily attach and detach the valve cap 130 to and from the valve body 110.

For example, when the valve cap 130 is coupled to the valve body 110, the valve cap 130 may be moved in the downward direction of the valve body 110. While the valve cap 130 is being moved, the valve cap 130 may be extended by the locking bump 114.

When the locking bump 114 is completely inserted into the coupling hole 131, the valve cap 130 may be restored to the original shape by a compensating force thereof. As the valve cap 130 is restored to the original shape, the valve cap 130 may prevent the locking bump 114 from being separated from the coupling hole 131.

Furthermore, when the valve cap 130 is separated from the valve body 110, the valve cap 130 may be extended in the outer direction of the valve cap 130. At this time, the valve body 110 may have a separation groove 115 formed therein. The separation groove 115 may be formed toward the inward direction of the valve body 110. The user may easily extend the valve cap 130 through the separation groove 115.

The user may extend the valve cap 130 through the separation groove 115 such that the length of the valve cap 130 becomes longer than the length of the locking bump 114. Therefore, the user may easily separate the valve cap 130 from the valve body 110.

While the present invention has been described with respect to the specific embodiments, it will be apparent to those skilled in the art that various changes and modifications may be made without departing from the spirit and scope of the invention as defined in the following claims.

In accordance with the embodiments of the present invention, as the valve body and the valve cap are coupled by a snap-fit method, the valve body and the valve cap may be easily coupled thereof. Furthermore, as the valve body and the valve cap are coupled by a snap-fit method, the valve cap may be easily separated from the valve body thereof.

What is claimed is:

1. An air valve comprising:
a valve body into which an air cut-off unit is inserted; and
a valve cap preventing the air cut-off unit from being discharged outside of the valve body,
wherein the valve body comprises an air inlet formed through one side of the valve body and an air outlet formed through the one side of the valve body,
wherein the air cut-off unit comprises an air duct corresponding to the position of the air inlet or the air outlet, and a blocking member selectively blocking the air inlet or the air outlet,
wherein the air cut-off unit is pressed to match the position of the air duct with the position of the air inlet or the air outlet, and
wherein the valve body and the valve cap are coupled to each other by a snap-fit method.

2. The air valve of claim 1, wherein the valve body has a locking bump formed to protrude from a portion to which the valve cap is coupled.

3. The air valve of claim 2, wherein the locking bump has a length increasing toward one side thereof.

4. The air valve of claim 2, wherein the valve cap has a coupling hole formed therethrough, to which the locking bump is coupled.

5. The air valve of claim 2, wherein the locking bump comprises a triangle shape having an inclined surface.

6. The air valve of claim 5, wherein the valve body and the valve cap are coupled by moving the valve cap in a downward direction of the valve body along the inclined surface of the locking bump.

7. An air valve comprising:
a valve body into which an air cut-off unit is inserted; and
a valve cap preventing the air cut-off unit from being discharged outside of the valve body,
wherein the valve body comprises an air inlet formed through one side of the valve body and an air outlet formed through the one side of the valve body,
wherein the air cut-off unit comprises an air duct corresponding to the position of the air inlet or the air outlet, and a blocking member selectively blocking the air inlet or the air outlet,
wherein the air-cut off unit is axially movable within the valve body between a default state wherein the blocking member blocks the air inlet or the air outlet and a pressed state wherein the air duct matches a position of the air inlet or the air outlet, wherein the air cut-off unit comprises a spring that biases the air cut-off unit in the default state and the air cut-off unit can be pressed to the pressed state, and wherein the valve body and the valve cap are coupled to each other by a snap-fit method.

8. The air valve of claim 7, wherein the valve body has a locking bump formed to protrude from a portion to which the valve cap is coupled.

9. The air valve of claim 8, wherein the locking bump has a length increasing toward one side thereof.

10. The air valve of claim 8, wherein the valve cap has a coupling hole formed therethrough, to which the locking bump is coupled.

11. The air valve of claim 8, wherein the locking bump comprises a triangle shape having an inclined surface.

12. The air valve of claim 11, wherein the valve body and the valve cap are coupled by moving the valve cap in a downward direction of the valve body along the inclined surface of the locking bump.

13. The air valve of claim 7, wherein pressing the air-cut off unit to move the air-cut off unit from the default state to the pressed state compresses the spring.

* * * * *